(12) United States Patent
Constantinides et al.

(10) Patent No.: US 6,394,462 B1
(45) Date of Patent: May 28, 2002

(54) PUSH ROD SEAL FOR DISC BRAKE ACTUATOR

(75) Inventors: Savvas K. Constantinides; Ted D Smith, both of Fresno, CA (US)

(73) Assignee: TSE Brakes, Inc., Fresno, CA (US)

( * ) Notice: Subject to any disclaimer, the term of this patent is extended or adjusted under 35 U.S.C. 154(b) by 0 days.

(21) Appl. No.: 09/491,984

(22) Filed: Jan. 26, 2000

(51) Int. Cl.[7] .................................................. F02F 11/00
(52) U.S. Cl. ........................ 277/502; 277/908; 277/436; 277/437; 92/68; 188/153 D
(58) Field of Search ................................. 277/502, 908, 277/909, 436, 437, 435; 188/153 R, 153 D, 153 A, 107, 106 R (56) References Cited

U.S. PATENT DOCUMENTS

| 1,068,157 | A | * | 7/1913 | Nelson | 277/437 |
|---|---|---|---|---|---|
| 1,444,457 | A | * | 2/1923 | Gates | 277/437 |
| 2,368,380 | A | * | 1/1945 | Ruzicka | 277/437 |
| 2,417,828 | A | * | 3/1947 | Joy | 277/437 |
| 3,057,630 | A | * | 10/1962 | Sneed | 277/437 |
| 3,813,994 | A | * | 6/1974 | Swander, Jr. et al. | 92/63 |
| 3,842,716 | A | | 10/1974 | Swander, Jr. | |
| 4,239,244 | A | * | 12/1980 | Brent | 277/165 |
| 4,425,838 | A | * | 1/1984 | Pippert | 92/86 |
| 4,773,363 | A | * | 9/1988 | Strizke | 277/437 |
| 4,811,704 | A | * | 3/1989 | Boehmer et al. | 277/437 |
| 5,002,164 | A | * | 3/1991 | Bowyer | 188/170 |
| 5,050,895 | A | * | 9/1991 | Hashish et al. | 277/188 R |
| 5,105,727 | A | | 4/1992 | Bowyer | |
| 5,320,026 | A | | 6/1994 | Pierce | |
| 5,377,579 | A | * | 1/1995 | Pierce | 92/63 |
| 5,392,691 | A | * | 2/1995 | Schultz | 92/168 |
| 5,507,217 | A | | 4/1996 | Plantan | |
| 5,553,869 | A | * | 9/1996 | Stamback | 277/437 |
| 5,701,800 | A | * | 12/1997 | Kaup | 92/128 |
| 5,791,232 | A | * | 8/1998 | Smith | 92/128 |
| 5,829,339 | A | * | 11/1998 | Smith | 277/437 |
| 5,937,733 | A | | 8/1999 | Stojic | |
| 5,957,032 | A | | 9/1999 | Hicks | |
| 6,216,831 | B1 | * | 4/2001 | Taylor | 188/280 |

FOREIGN PATENT DOCUMENTS

| AT | 244786 | * | 1/1966 | 188/170 |
|---|---|---|---|---|
| DE | 2313728 | * | 9/1973 | 188/170 |

* cited by examiner

*Primary Examiner*—Christopher P. Schwartz
*Assistant Examiner*—Devon Kramer
(74) *Attorney, Agent, or Firm*—Mark D. Miller (57) ABSTRACT

This is a reliable long-lasting removable seal for attachment to the push rod opening of a service brake actuator that is to be used with a disc brake system. The seal allows the service brake actuator to enjoy the benefits of having breather holes in its housing wall while preventing any unwanted contaminants brought in through such holes from being transmitted to the attached disc brake mechanism. The seal is a hollow molded piece in the form of a tubular insert made of a slightly deformable material that fits into the central opening in the lower service brake housing through which the push rod extends. Flanges on the insert sealingly engage the wall of the service brake housing, and a central bore sealingly engages the push rod. The insert may include a separate internal bushing made of durable material which supports at least one annular seal for engaging the push rod. The seal of the present invention prevents dirt, debris, moisture or other foreign materials from being transmitted by the push rod to the outside of the service brake actuator housing where they could contaminate the sensitive internal parts of the attached disc brake system, thereby reducing the risk of failure and prolonging the useful life of the disc brake system.

17 Claims, 8 Drawing Sheets

PUSH ROD SEAL FOR DISC BRAKE ACTUATOR

BACKGROUND OF THE INVENTION

1. Field of the Invention

The present invention relates to disc brake systems for vehicles, and in particular to a seal for engagement with the push rod of a disc brake actuator to prevent unwanted contaminants from entering the disc brake mechanism.

2. Description of the Prior Art

The use of disc brakes is becoming more and more common in the trucking industry to control the brakes of heavy-duty vehicles and their trailers. Foundation disc brakes on trucks and trailers are generally operated using separately manufactured brake actuators which are mated to the disc brake systems. The internal operating mechanisms of foundation disc brake systems have become increasingly more precise. Foreign material and contaminants such as dirt, moisture, or other elements can reduce the useful life of a disc brake if allowed to enter the internal mechanism. These materials can cause rust or corrosion of the sensitive disc brake mechanism, potentially resulting in jamming or other hazardous failures of the disc brakes. It is therefore important that the disc brakes be securely sealed to their corresponding brake actuators in order to avoid such contamination.

A typical service brake actuator is characterized by a closed housing which contains a movable diaphragm stretched across the inside. One side of the diaphragm moves a slidable push rod which extends out of the housing for attachment to the disc brake system of the vehicle. On the other side of the diaphragm a sealed chamber is formed within the housing. An opening is provided in this chamber for connection to a pneumatic (air) pressure source usually provided by an air compressor on board the vehicle. The brakes of the vehicle can be applied by introducing sufficient pneumatic pressure into the sealed chamber to act against the service brake diaphragm which moves the push rod out. A small return spring is ordinarily provided inside the service brake housing around the push rod to urge it to retract when the air pressure behind the diaphragm is reduced.

The disc brake system is typically attached directly to the bottom of the service brake actuator so that as the push rod extends out of the actuator, it extends into the disc brake mechanism. An annular rubberized bead is typically provided on the outer mating surface of the disc brake mechanism for engagement with the service brake actuator. This bead forms a seal between the disc brake system and the service brake actuator to prevent foreign material from entering the disc brake system. In operation, the outer end of the push rod engages a caliper arm on the disc brake. When the vehicle operator presses on the brake pedal, air pressure is applied to the service brake actuator causing the rod to push out. The rod then engages the arm and pushes against it. As the arm is pushed, it causes the disc brake calipers to push frictional pads against the wheel rotor or disc which slows or stops the moving vehicle. Releasing the brake pedal removes air pressure from the service brake actuator causing the push rod to retract, thereby disengaging the arm and releasing the disc brakes.

While the vehicle is operating, air pressure is being constantly applied to and removed from the sealed chamber in the upper portion of the service brake housing to operate the brakes of the vehicle. The application and removal of air pressure causes the diaphragm inside the housing to move back and forth, moving the push rod in and out. In order for the diaphragm to be able to expand, the air in the lower portion of the service brake housing is allowed to escape to the outside. Then, in order for the diaphragm to contract, air is allowed to enter this area.

Typical service brake housing assemblies include a plurality of air holes in the lower housing to allow air to enter and exit this region as the diaphragm moves back and forth. The unfortunate effect of this action is to allow dirt, water, oil, debris, and other unwanted materials to enter the service brake housing from the outside through the air holes. Transmission of this material to the sensitive disc brake mechanism could lead to failures of the disc brakes thereby shortening their useful life.

The use of O-rings to provide sealing engagement around a brake actuator push rod is well known. However, the use of such O-rings has generally been limited to providing a seal to maintain pressurization inside one of the brake actuator chambers, as in U.S. Pat. No. 5,937,733. In order to maintain the seal, the '733 patent relies on an external pivot on the push rod, since the push rod articulates (wobbles) as it extends through its stroke. The dust shield of U.S. Pat. No. 5,002,164 does not completely seal around the push rod, but acts as a guide for the push rod as it articulates through its stroke.

The invention of U.S. Pat. No. 5,320,026 employs a rubber dust guard in the form of a tubular bellows deployed in the upper housing of an emergency spring brake actuator to prevent particulate matter which enters the housing from passing beyond the main spring into the actuator tube where it might affect the sliding rod. However, this dust guard is not designed for use on a service brake actuator where the push rod articulates through its stroke. Moreover, the accordion shape of this dust guard includes numerous corners and elbows, each of which is subject to constant movement and stress which lead to failures and leaks allowing contaminants to find their way to the push rod. The frequency of such failures would be increased in a service brake actuator because of the higher frequency of use, and because the service brake accordion dust guard would have to completely collapse every time the service brake is used, requiring that it be made of a thinner material which would tolerate less stress.

It is therefore desirable to provide a reliable, long-lasting seal for engagement with the push rod of a service brake actuator which prevents contaminants and foreign material brought in through breather holes in the actuator from being transmitted along the push rod to the sensitive internal mechanisms of an attached disc brake.

SUMMARY OF THE INVENTION

The present invention overcomes the drawbacks of existing dust shields and allows a service brake actuator to enjoy the benefits of having breather holes in its housing while preventing any contaminants brought into the housing through such holes from being transmitted to an attached disc brake mechanism by providing a highly reliable, long-lasting removable attachment to the lower service brake housing that provides sealing engagement with the housing and with the push rod as it moves in and out of the housing. The attachment of the present invention is a molded piece in the form of a tubular insert made of a slightly deformable material which fits into the central opening in the lower service brake housing through which the push rod extends. The tubular insert is hollow in order to allow the push rod to pass through it. The insert includes an outer annular flange which fits over the outside of the housing wall at the opening, and an inner annular flange which fits over the inside of the housing wall at the opening. Each of these flanges is made of a deformable material having elastic or rubber properties in order to provide a seal between the tubular insert and the housing wall. The insert also includes a collar adjacent to the inner flange for supporting an insertable bushing that is made of more durable material than the insert itself. The bushing fits into the inside of the collar and provides support for at least one annular seal or O-ring. The annular seal provides a seal against the push rod as it slides in and out of the tubular insert. Additional annular seals may be provided in the bushing for multiple seals with the push rod. An annular extension or brush is also provided at the distal end of the collar for snug, slidable engagement with the push rod.

The collar extensions and the annular O-ring seal(s) around the push rod prevent dirt, debris, moisture or other foreign materials from being transmitted by the push rod outside of the service brake actuator housing where they could contaminate the attached disc brake system. As the push rod is extended out of the actuator, any large pieces of foreign material on the surface of the push rod will come into contact with the collar extension. Because it is snugly engaged around the push rod, the collar extension will cause such debris to be brushed off the push rod as it slides through the extension. Then, as the push rod passes through the O-ring seal(s), the seal(s) remove any remaining foreign material from the push rod, preventing such material from exiting the actuator where it could contaminate the disc brake system. The collar extension and annular seals also prevent introduction of foreign material that might otherwise occur because of vibrations, the force of gravity, and the like.

Several other benefits are also provided by the present invention. As the disc brake caliper arm is moved by the push rod, it moves through an arc around a pivot. Because of this arcing movement, when the push rod engages the disc brake caliper arm it does not travel in and out of the actuator in a straight line, but is affected by the arc of the caliper arm. The present invention compensates for this slight wobbling movement while maintaining a tight seal around the push rod. This is accomplished by the separation of the more durable bushing from the deformable tubular insert. Because the bushing which holds the O-ring(s) is made of a durable material, it holds the O-ring seal(s) firmly against the push rod. However, because the bushing itself is inserted into the deformable tubular insert, the insert is able to "give" or deform slightly allowing the bushing to tilt as the push rod it is sealed to travels through the arc of the caliper arm. The use of dissimilar materials allows the benefit of both the bearing attributes of the durable bushing together with the flexible attributes of the deformable insert. The insert centers the bushing while providing flexibility so that the bushing can be tilted slightly with the movement of the push rod.

The present invention provides not only a reliable seal around the push rod, but also a reliable seal between the insert and the service brake housing wall. In addition, the outer annular flange of the insert is designed for sealing engagement with the mating surface of the disc brake mechanism. As a result, an additional seal is provided between the brake actuator and the disc brake system to further prevent introduction of contaminants.

Several alternative embodiments of the invention are available. In a first alternative embodiment, the bushing itself is provided with an annular flange that is surrounded by the slightly deformable material of the insert. This embodiment provides more support for centering the push rod as it travels in and out of the service brake actuator. In a second alternative embodiment, the separate bushing and annular sealing rings are eliminated and the push rod is sealed directly to the slightly deformable material of the insert itself. In a third alternative embodiment, the breather holes of the service brake housing are plugged or eliminated, such that air pressure is allowed to build up in the chamber below the diaphragm. This embodiment relies heavily on the sealing properties of the insert to maintain the pressure in the lower chamber, but prevents any foreign material from ever entering the service brake actuator housing where it might otherwise be transmitted to the disc brake system.

It is therefore a primary object of the present invention to provide a seal for attachment to the push rod and push rod opening of a service brake actuator which prevents foreign material brought into the actuator through the actuator breather holes from being transmitted out of the actuator by the movements of the push rod, vibrations, gravity or the like.

It is also a primary object of the present invention to provide an insert for attachment to the push rod opening of a service brake actuator which is reliably sealed against the walls of the opening and also reliably sealed against the movable push rod of the actuator in order to prevent contaminants from being transmitted out of the actuator by the movements of the push rod, vibrations, gravity or the like.

It is also an important object of the present invention to provide a two piece insert for attachment to the push rod opening of a service brake actuator which includes a slightly deformable tubular member having annular flanges for sealing engagement with the wall of the actuator housing, and a more durable bushing supported by the tubular member for holding at least one annular seal for sealing engagement with the movable push rod of the actuator.

It is also an important object of the present invention to provide a one or two piece insert for sealing attachment to the push rod and push rod opening of a service brake actuator that is flexible enough to compensate for slight wobbling of the push rod as is moves through a slightly arcuate path while maintaining reliable seals with both the push rod and push rod opening.

It is a further object of the present invention to provide an attachment for a service brake actuator which seals the push rod and push rod opening of the actuator and which also seals against an attached disc brake system for preventing foreign material from being transmitted from the actuator to the disc brake system.

Additional objects of the invention will be apparent from the detailed descriptions and the claims herein.

DETAILED DESCRIPTION OF THE PREFERRED EMBODIMENTS

Figure 1:
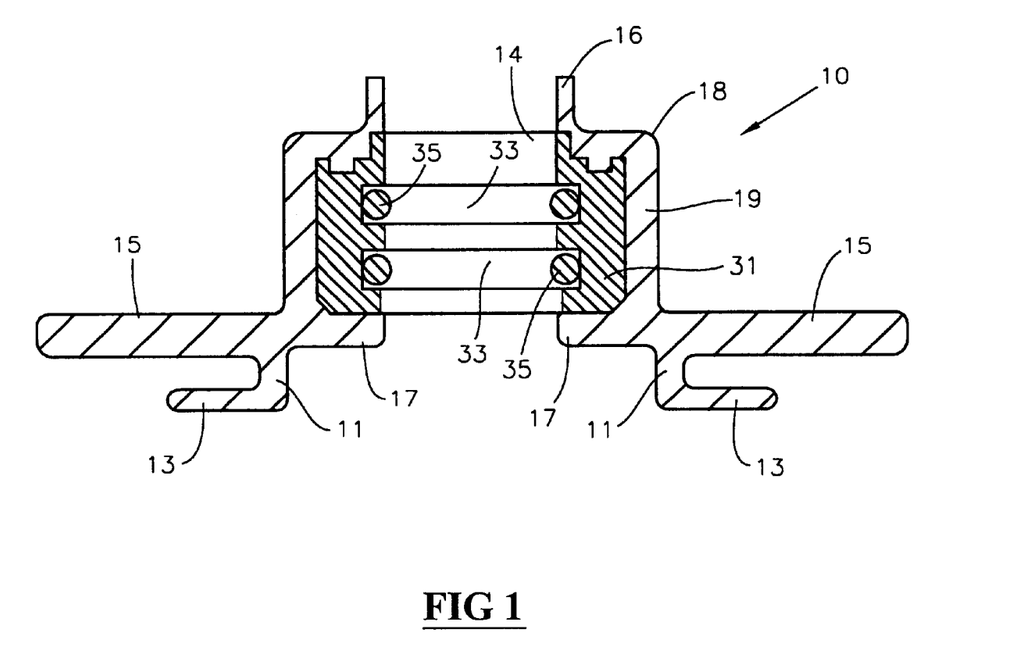
FIG. 1 is a cross sectional side view of the present invention.
Figure 2:
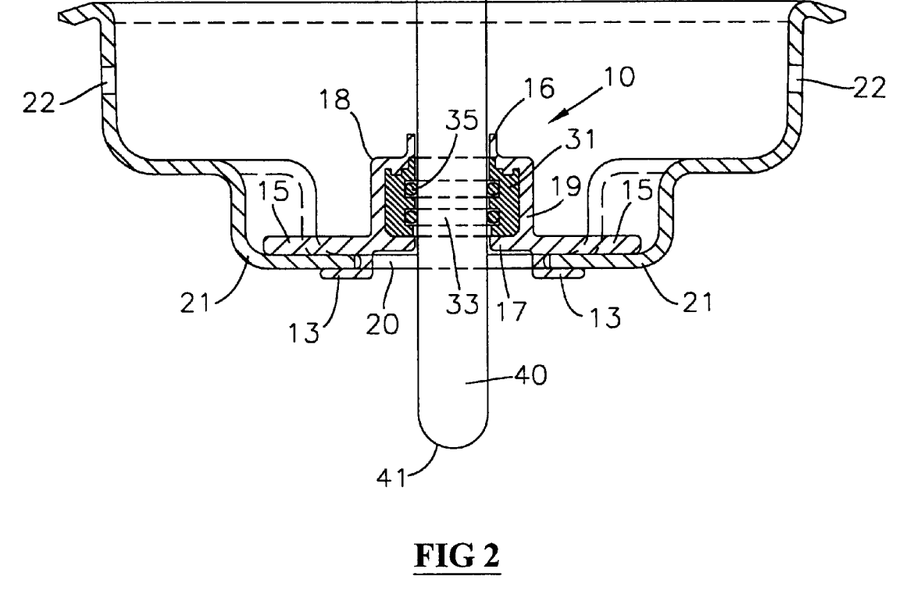
FIG. 2 is a cross sectional side view of the invention installed in the lower housing cup of a service brake actuator.

Referring to the drawings wherein like reference characters designate like or corresponding parts throughout the several views, and referring particularly to FIG. 2 it is seen that the invention includes a hollow insert 10 made of slightly deformable plastic or rubberized material. Insert 10 has a wide central axial bore 14 for receiving the push rod 40 of the service brake actuator 25, and includes a grommet section 11 for engagement with the circular push rod exit opening 20 of the service brake actuator 25. Opening 20 is located in the center of the lower housing cup wall 21 of the service brake actuator. Grommet section 11 includes a lower annular flange 13 and an upper annular flange 15. Each of flanges 13 and 15 is in the form of a disk having an orientation that is perpendicular to axial bore 14, each disk having an opening in the center. Flanges 13 and 15 are designed for engagement above and below housing wall 21, and provide a secure and reliable seal with wall 21.

The central opening of flange 13 is much wider than that of flange 15, the opening of flange 15 including an annular interior section 17 which comes into close contact with push rod 40. Insert 10 also includes a hollow central collar 19 adjacent to section 17 and flange 15. Collar 19 supports a removable bushing 31 made of durable material that is held in place by annular shoulder 18. An annular upwardly protruding extension or brush 16 is provided above shoulder 18 for snug engagement around push rod 40. Bushing 31 includes at least one recessed slot 33 for receiving an annular rubberized seal or O-ring 35. While two O-rings 35 are illustrated in the drawings, it is understood that as few as one or as many as several O-rings may be provided in bushing 31, depending upon the size of bushing 31 and collar 19.

Figure 3:
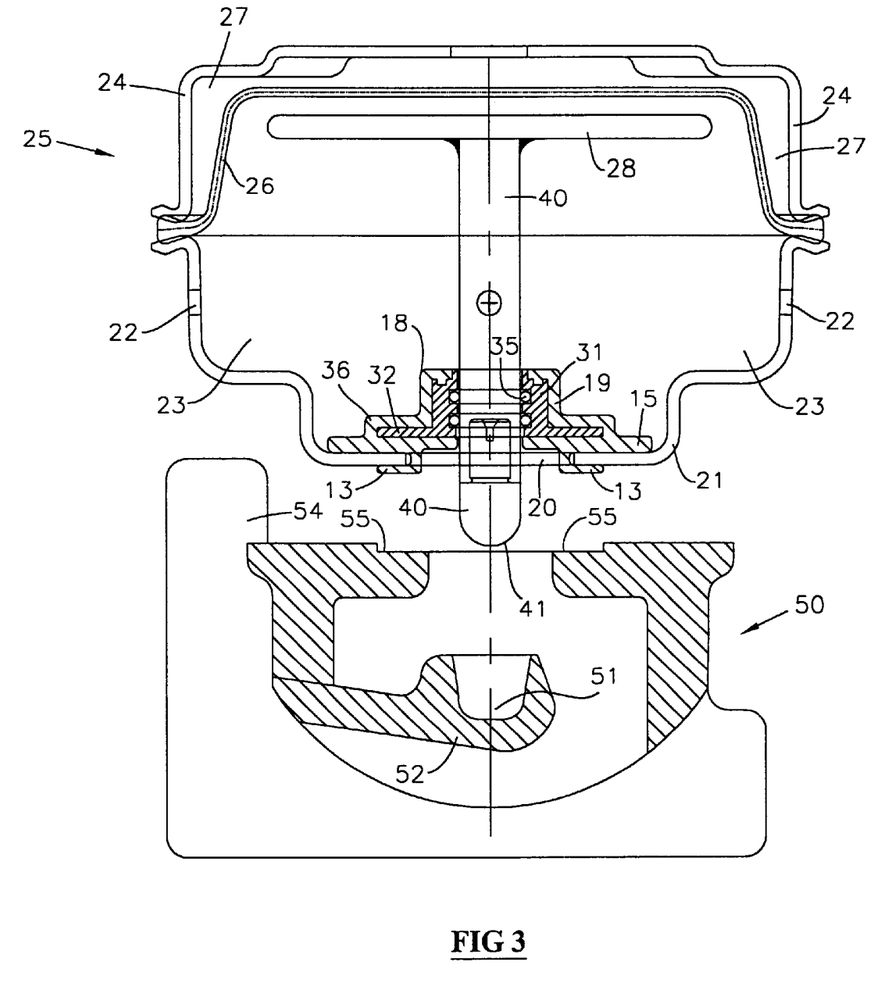
FIG. 3 is a cross sectional side view of an alternative embodiment of the invention installed in a service brake actuator prior to attachment to a disc brake system.

The outer end 41 of push rod 40 is rounded in order to facilitate engagement with a corresponding dimple 51 on disc brake arm 52, as seen in FIG. 3. The outer circumference of annular flange 13 is sized so that flange 13 fits into annular slot 55 of disc brake housing 54. When actuator 25 is attached to disc brake 50, disc brake housing 54 is brought immediately adjacent to actuator housing 21 such that annular rubberized bead 59 seals against actuator housing 21, and deformable flange 13 of the insert seals against slot 55 of the disc brake housing.

Actuator 25 is operated by the introduction of pressurized air through opening 29. This air fills the upper chamber 27 of the brake actuator defined by upper housing wall 24 and flexible diaphragm 26. As chamber 27 is filled with air, diaphragm 26 is expanded causing pressure plate 28 to move down. Plate 28 is attached to push rod 40 such that as plate 28 is moved down by diaphragm 26, push rod 40 is extended out of the actuator. As diaphragm 26 expands, it displaces air in lower chamber 23. This air escapes to the outside through breather holes 22 located in the sides of lower housing cup 21. When air is removed from chamber 27, diaphragm 26 contracts and air is drawn back into chamber 23 through breather holes 22. This air may also bring dirt, debris, moisture or other undesirable foreign material into chamber 23 from the outside. The seal(s) provided by O-ring(s) 35 against push rod 40 prevent such undesirable material from being transmitted out of the actuator 25 into the disc brake system 50.

Figure 4:
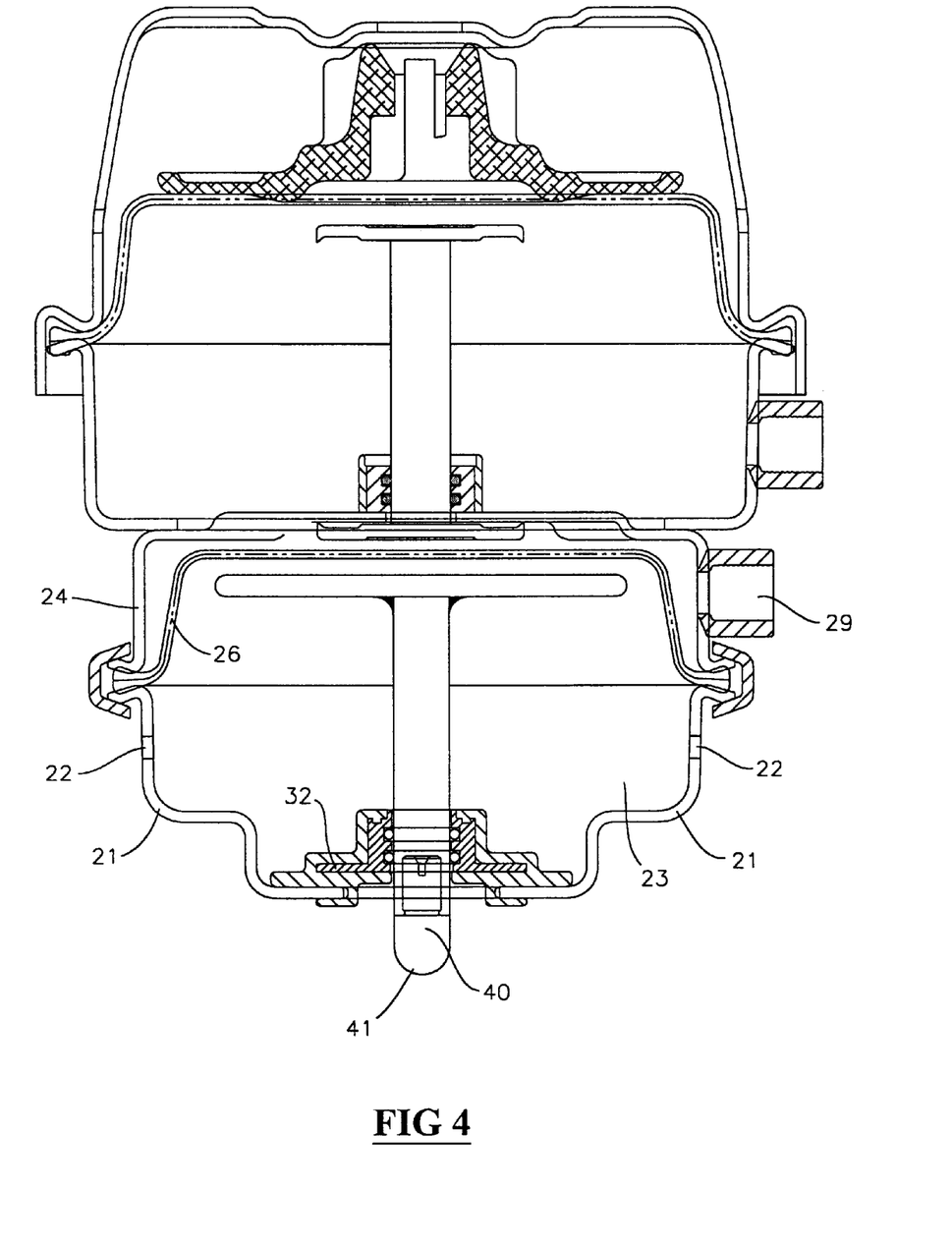
FIG. 4 is a cross sectional side view of an alternative embodiment of a combined service brake and emergency brake actuator with the invention installed in the service brake actuator.
Figure 6:
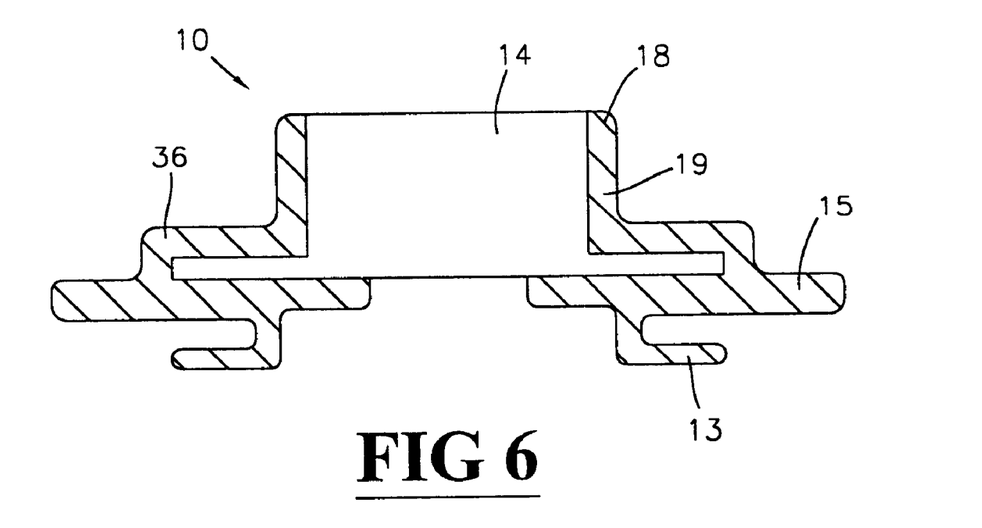
FIG. 6 is a cross sectional side view of another embodiment shown without a bushing in place.
Figure 7:
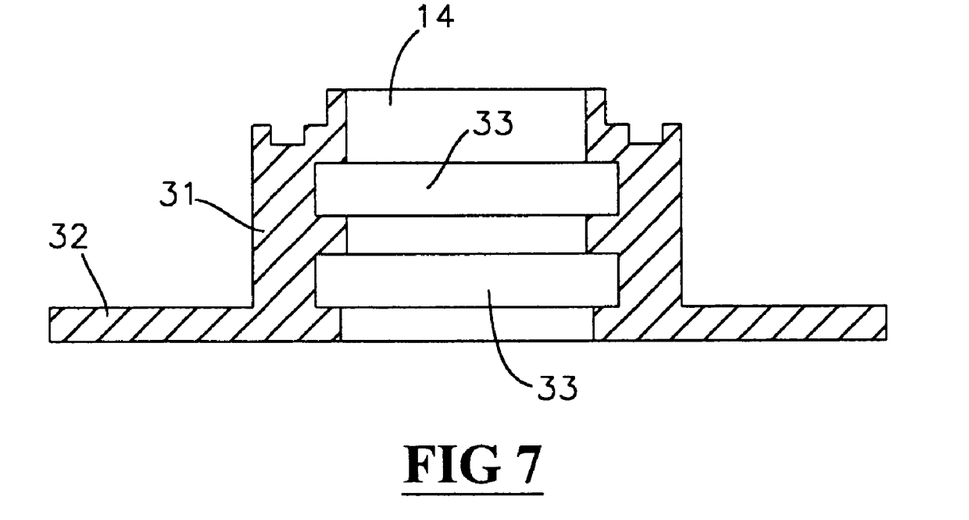
FIG. 7 is a cross sectional side view of the bushing that fits into the embodiment of FIGS. 3 and 4.
Figure 8:
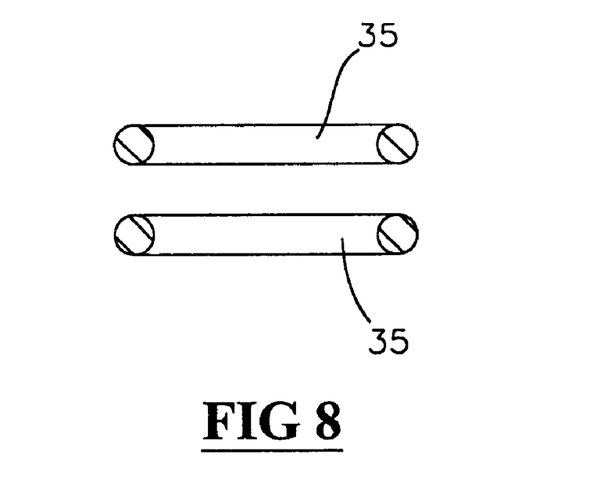
FIG. 8 is a cross sectional side view of the annular seals that fit into the bushing of FIG. 7.

In a first alternative embodiment shown in FIGS. 3 and 4, it is seen that bushing 31 is provided with a disk-shaped annular flange 32 having a central opening therein. As with bushing 31, flange 32 is completely enclosed by insert 10, specifically by annular shoulder 36. Flange 32 is made of the same durable material as bushing 31 thereby providing additional lateral support for the insert which helps to center the push rod 40 as it travels in and out of the housing. In a slight variation of this first alternative embodiment shown in FIG. 6, shoulder 18 is eliminated and bushing 31 is held in place inside insert 10 by disk 32 below shoulder 36.

Figure 5:
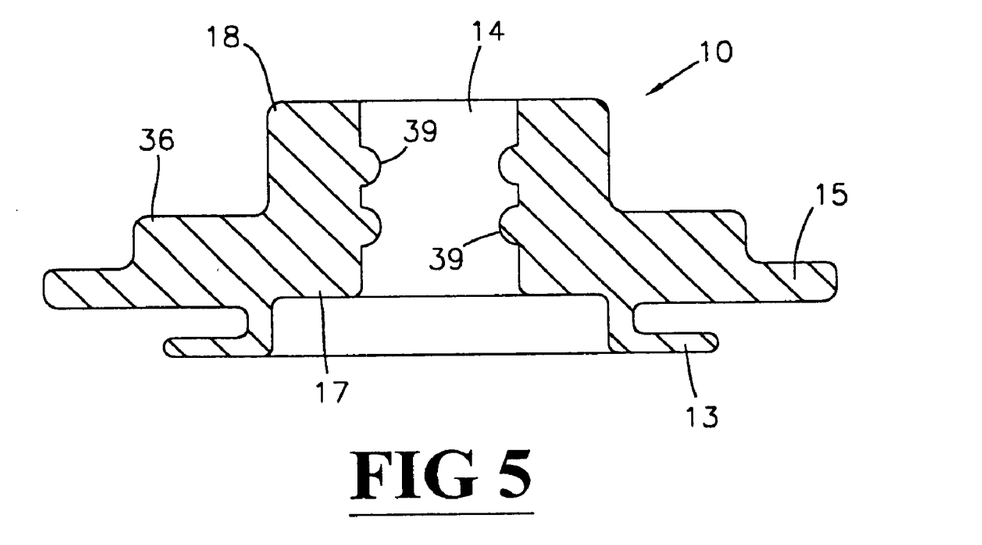
FIG. 5 is a cross sectional side view of another alternative embodiment of the invention.
Figure 9:
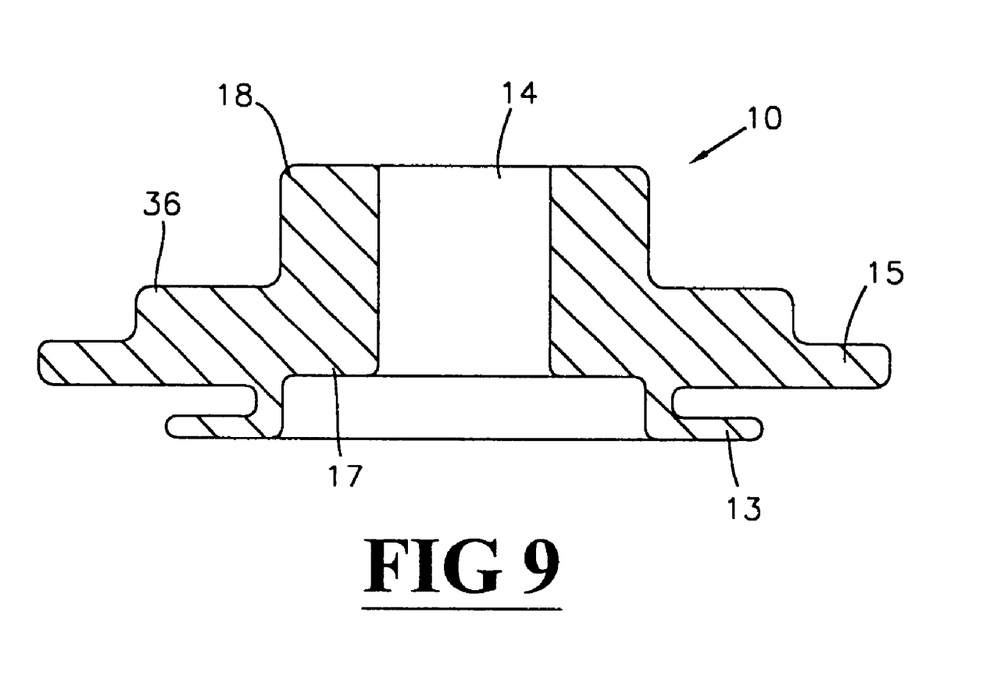
FIG. 9 is a cross sectional side view of another alternative embodiment of the invention.
Figure 10:
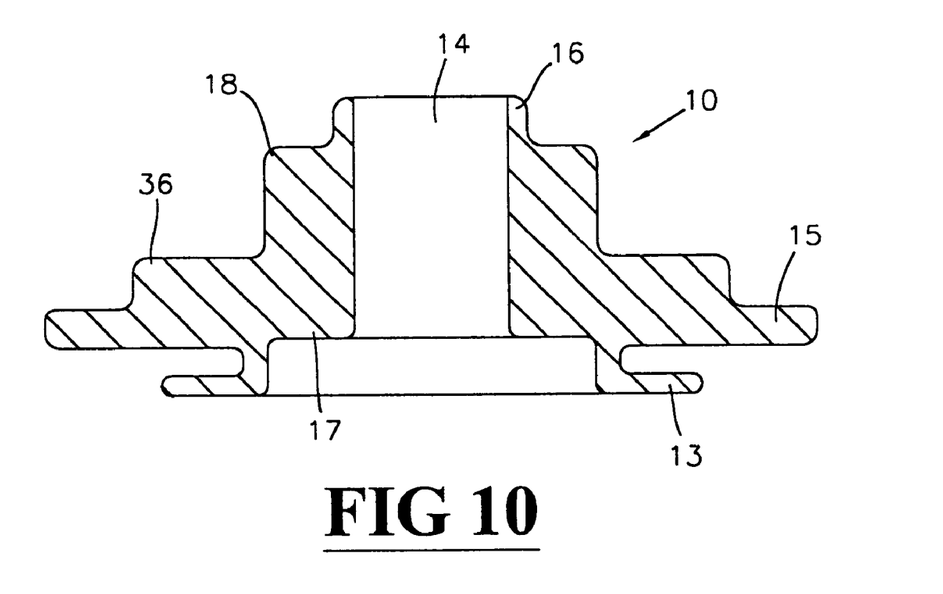
FIG. 10 is a cross sectional side view of another alternative embodiment of the invention.

In a second alternative embodiment shown in FIG. 5, it is seen that insert 10 is in the form of a single unit made of deformable material. Bushing 31 is not present. In this embodiment, at least one annular bead 39 is provided in axial bore 14 for sealing engagement with push rod 40. Although two beads 39 are shown in FIG. 5, as few as one or as many as several beads 39 may be used. In a slight variation of this embodiment shown in FIGS. 9–10, annular beads 39 may be eliminated from the single unit such that push rod 40 is sealingly engages with the entire central bore 14 of the insert.

Figure 11:
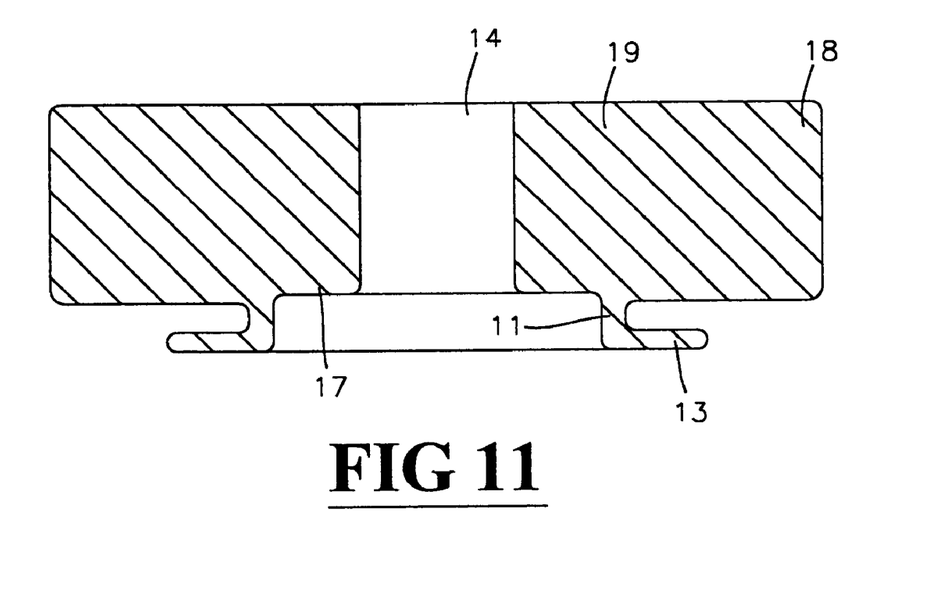
FIG. 11 is a cross sectional side view of another alternative embodiment of the invention.

In a third alternative embodiment, collar 19 may be widened such that upper flange 15 is eliminated. Wall 21 of the actuator fits into gap 11 between widened collar 19 and flange 15. The diameter of collar 19 may be the same as, greater than (as in FIG. 11) or smaller than that of lower flange 13. This embodiment may be provided either with or without a bushing 31.

In a fourth alternative application, any of the above embodiments of the invention may be utilized in a service brake chamber that has no breather holes 22. In such an application, when pressurized air is introduced into upper chamber 27, it expands diaphragm 26, causing pressure to build up in lower chamber 23, instead of escaping to the outside. The seal of the present invention is sufficiently strong to withstand this pressure. As a result, in such an application the seal of the present invention allows the elimination of the air breather holes removing the possibility of any introduction of foreign material into the brake actuator or into the attached disc brake mechanism.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A seal for a brake actuator of a type having a chamber with an opening therein through which a push rod reciprocates between extended and retracted positions comprising a tubular insert made of slightly deformable material for sealing engagement with the push rod opening of said actuator, said insert having an axial bore therethrough for sealing engagement with the push rod of said actuator, a first outwardly extending annular flange at the proximal end of said insert, and an integral collar adjacent to said annular flange, said collar extending to the distal end of said insert wherein a second outwardly extending annular flange is provided between said first flange and said collar.

2. The seal of claim 1 wherein an upwardly extending annular axial flange is provided at the distal end of said insert attached to said collar.

3. The seal of claim 1 wherein at least one integral annular bead is provided inside said bore for sealing engagement against said push rod.

4. The seal of claim 2 wherein at least one integral annular bead is provided inside said bore for sealing engagement against said push rod.

5. The seal of claim 1 wherein an opening is provided on the inside of said collar and a bushing made of durable material is provided for insertion into said opening, said bushing having an axial bore therethrough, said axial bore having at least one annular recess located on the inside thereof, and at least one annular seal is provided for insertion into said recess for sealing engagement against the push rod of said actuator.

6. The seal of claim 3 wherein said bushing includes an integral annular disk at its proximal end and said insert includes a corresponding internal recess for receiving said disk.

7. The seal of claim 5 wherein an upwardly extending annular axial flange is provided at the distal end of said insert adjacent to said collar.

8. In a service brake actuator of the type having an upper and lower housing attached together, an elastomeric diaphragm suspended within said housing and being sealingly attached to the edges thereof to form a chamber with said upper housing, a push rod in said lower housing extending out therefrom through a central opening for movement between retracted and extended positions according to the movement of said diaphragm, and a plurality of air breather holes in said lower housing, the improvement wherein a seal is provided, said seal comprising a tubular insert made of slightly deformable material for sealing engagement with said central opening of said actuator, said insert having an axial bore therethrough for sealing engagement with the push rod of said actuator, a first outwardly extending annular flange at the proximal end of said insert, a second outwardly extending annular flange near said first annular flange, and an integral collar adjacent to said second annular flange, said collar extending to the distal end of said insert.

9. The seal of claim 7 wherein an upwardly extending annular axial flange is provided at the distal end of said insert attached to said collar.

10. The seal of claim 8 wherein at least one integral annular bead is provided inside said bore for sealing engagement against said push rod.

11. The seal of claim 9 wherein at least one integral annular bead is provided inside said bore for sealing engagement against said push rod.

12. The seal of claim 8 wherein an opening is provided on the inside of said collar and a bushing made of durable material is provided for insertion into said opening, said bushing having an axial bore therethrough, said axial bore having at least one annular recess located on the inside thereof, and at least one annular seal is provided for insertion into said recess for sealing engagement against the push rod of said actuator.

13. The seal of claim 12 wherein said bushing includes an integral annular disk at its proximal end and said insert includes a corresponding internal recess for receiving said disk.

14. The seal of claim 13 wherein an upwardly extending annular axial flange is provided at the distal end of said insert adjacent to said collar.

15. In a service brake actuator of the type having an upper and lower housing attached together, an elastomeric diaphragm suspended within said housing and being sealingly attached to the edges thereof to form a chamber with said upper housing, and a push rod in said lower housing extending out therefrom through a central opening for movement between retracted and extended positions according to the movement of said diaphragm, the improvement wherein a seal is provided, said seal comprising a tubular insert made of slightly deformable material for sealing engagement with said central opening of said actuator, said insert having an axial bore therethrough for sealing engagement with the push rod of said actuator, a first outwardly extending annular flange at the proximal end of said insert, a second outwardly extending annular flange near said first annular flange, a collar adjacent to said second annular flange, said collar extending to the distal end of said insert, an opening on the inside of said collar, a bushing made of durable material for insertion into said opening, said bushing having an axial bore therethrough, said axial bore having at least one annular recess located on the inside thereof, and at least one annular seal for insertion into said recess for sealing engagement against the push rod of said actuator.

16. The seal of claim 15 wherein said bushing includes an integral annular disk at its proximal end and said insert includes a corresponding internal recess for receiving said disk.

17. The seal of claim 16 wherein an upwardly extending annular axial flange is provided at the distal end of said insert adjacent to said collar.

* * * * *